(12) United States Patent
Shozda (10) Patent No.: US 8,678,721 B2
(45) Date of Patent: Mar. 25, 2014

(54) DUAL BLADE BORING TOOL ASSEMBLY

(75) Inventor: Andy Shozda, Schaumburg, IL (US)

(73) Assignee: Barbara Shozda, Schaumburg, IL (US)

(*) Notice: Subject to any disclaimer, the term of this patent is extended or adjusted under 35 U.S.C. 154(b) by 324 days.

(21) Appl. No.: 13/068,725

(22) Filed: May 17, 2011

(65) Prior Publication Data
US 2012/0294685 A1    Nov. 22, 2012

(51) Int. Cl.
*B23B 29/034*   (2006.01)
(52) U.S. Cl.
CPC ................................. *B23B 29/034* (2013.01)
USPC ........................................ 408/152; 408/153
(58) Field of Classification Search
USPC ........................................ 408/152, 153, 181
IPC ........................................ B23B 29/03,29/034
See application file for complete search history.

(56) References Cited

U.S. PATENT DOCUMENTS

| 191,561 | A | * | 6/1877 | Blair | 408/152 |
| 1,881,523 | A | * | 10/1932 | Guldager | 408/152 |
| 1,998,893 | A | * | 4/1935 | Cole et al. | 408/152 |
| 2,378,830 | A | * | 6/1945 | Chaddock | 408/152 |
| 3,524,382 | A | * | 8/1970 | Artaud | 407/45 |
| 5,222,846 | A | * | 6/1993 | Romi | 408/161 |
| 6,050,159 | A | * | 4/2000 | Kress et al. | 82/1.2 |
| 7,260,877 | B2 | * | 8/2007 | Broadley | 29/27 R |

FOREIGN PATENT DOCUMENTS

JP    06270001 A  *  9/1994

OTHER PUBLICATIONS

English translation of abstract of JP 06-270001.*

* cited by examiner

*Primary Examiner* — Daniel Howell
*Assistant Examiner* — Alan Snyder
(74) *Attorney, Agent, or Firm* — Lester N. Arnold (57) ABSTRACT

An improved dual blade boring tool having a solid surround housing portion in which a pair of parallel spaced transverse channel openings extend perpendicular to the longitudinal axis of the rotatable tool, a pair of dual cutter insert members are mounted in the channel openings, respectively, and are moved in opposite directions to each other responsive to rack and pinion movements of a rotatable cylindrical shaped cam member having at least a rack portion and being meshed to engage pinion portions provided on each of the dual insert members, whereby the rotation of the rack portion of the cam member converts to reciprocating movement of each of the meshed insert members to move oppositely disposed insert members in opposite and corresponding linear directions with respect to the surround housing of the boring tool.

3 Claims, 5 Drawing Sheets

DUAL BLADE BORING TOOL ASSEMBLY

BACKGROUND OF THE INVENTION

1. Field of the Invention

This invention relates to boring tool application for cutting, milling or boring of diametrical openings in workpieces, such as machining of precision bores, and particularly, to an improved novel boring tool assembly providing rack and pinion movement conversion to convert rotary movements of a rotatable cam member with rack means, to reciprocating linear movements of engaging pinion means on a pair of cutter insert members to move cutter blades carried on the cutter insert members to increase or decrease diametrical boring operations of the boring tool. Prior art boring tools similar to the present invention have commonly employed cutter blade carrier members that have achieved linear adjustment of the cutter blades by means of being carried on oppositely rotating threaded portions of screw mechanisms, such as having one of the cutter insert members being moved by the rotations of a left-hand threaded portion and another of the cutter insert members being moved oppositely by the rotations of a right-hand threaded portion of the screw mechanism, whereby the cutter blades carried on the free end portion of the cutter insert members are simultaneously moved outwardly or inwardly of the carrier boring tool to increase or decrease the diametrical bore in the workpiece. Often, as disclosed by boring tool devices of the prior art, the cutter blade carrying members are mounted on the top surface of the cylindrical boring tool, and have therefore been difficult to achieve a secure or rigid or even a protected mounting so as to deter or prevent vibration or chatter during cutting operations of the rotating boring tool.

The present invention provides a solid surround housing for the cylindrical boring tool providing the dual blade insert carrier members to be mounted in at least a transverse channel opening in the housing extending perpendicular to the longitudinal axis of the cylindrical boring tool, and providing fastener means to secure the insert carrier members against linear movement during cutting operations of the boring tool. The solid surround housing is thought to be an improvement of the prior art boring tool assemblies which mount the cutter blade carrier members in guidance grooves on exposed planar surface of the boring tool, whereby the carrier members are exposed to boring operations, and are subject to being loosened from vibrations and chatter and metal trimming fragments are directly exposed to the linear movement mechanisms, and mounting groves of the cutter carrier members.

The present invention additionally provides rotary cam member or means having rack threaded portion or rack means to engage pinion linear threaded portions provided on the dual blade insert carrier members whereby rack and pinion means are provided to convert rotary movement of the cam member to reciprocating linear movement of the engaged cutting blade carrier members, whereby the movements of the cutting blade carrier members are achieved through actions of rack and pinion mechanisms.

2. Background of the Invention

Boring tools with single fixed cutter blades have been largely replaced by use of dual blade boring tools presenting dual cutter blades being carried or mounted to free end portions of linear moving carrier members to achieve faster diametrical boring in workpieces, but the prior art dual blade boring tool assemblies have often failed to protect the carrier members from vibration or chatter action or centrifugal forces created by the operations of the rotating boring tool. Further, a wide variety of alternative mounting and movement mechanisms have been disclosed, including providing guidance grooves on an exposed planar surface, directly exposing the carrier members and/or their movement mechanisms to metal trimmings and fragments create by boring operations, and by their design, providing a less secure mounting than is presented by the present invention which provides a solid surround housing by providing the dual carrier insert members to be inserted and protected with an internal transverse extending channel opening in the boring tool that extends through the diametrical dimension of the cylindrical boring tool perpendicularly to the longitudinal axis of the boring tool.

Further, boring tools of the prior art have provided relatively complicated movement mechanisms to achieve linear movements of the dual cutter blade carrier members often comprised of multiple devices on which to mount the carrier members and provide movements corresponding to movements of such mounting devices, and relatively complicated fastener means to set or lock the carrier members against additional movement after being adjusted as desired. The most pertinent prior art boring tools have disclosed a cylindrical boring tool having dual blade carrier insert members employing a single screw mechanism which is provided with a first threaded section of left-hand threads, and a second threaded section of right-hand threads, and connecting means for connecting each of the carrier insert members to a selected one of the first left-hand threads and the other of the carrier insert members to another selected one of the second right-hand threads, whereby with rotational movement of the screw mechanism, the carrier insert member are moved linearly in opposite corresponding directions to each other, to achieve adjustment of the cutter blades carried thereby.

It is known by practitioners of movement mechanisms to utilize rack and pinion mechanisms to provide precise and stable movements of reciprocating parts through means of converting rotary movement to reciprocating linear movement, and the principles of a rack-and-pinion mechanism design is implemented into the novel design of the present invention and disclosed and applied to the preferred embodiment of the detailed description.

3. Description of the Prior Art

The pertinent prior art has been disclosed by the inventor's field of search in US Classes 408/183, 182, 181 principally, and for example, there is shown and disclosed in U.S. Pat. No. 3,767,317, a dual bladed cutting tool in which a pair of cutter supports are carried in or mounted in an open channel or grove on the planar face of the tool housing, and an adjusting screw is provided having oppositely threaded portions engaging oppositely moving cutter supports, with a so-called left-hand or right-hand thread, so that the rotation of the screw causes equal linear movements of the cutter supports in opposite linear directions perpendicular to the direction of carry of the cutting tool, and provides a separate setting or locking screw and arresting collar to lock the screw mechanism during cutting operations.

U.S. Pat. No. 7,156,588 discloses rotary boring tools having two separate tool portions, a fixed tool body and an adjustable tool carrier, axially adjustable with respect to the fixed too body, and providing for cutter inserts to be adjustably mounted on the adjustable tool carrier as a separate adjustable carrier, thus providing a two part carrier, the two parts being secured together by a locking screw and another adjusting screw being required to adjust the cutting blade insert.

U.S. Pat. No. 4,278,372 discloses a dual blade boring tool carrying on its open free end portion a pair of oppositely movable blade blocks on which to mount cutter blades providing for actuator pins movable in opposite directions in response to rotation of a differential screw device, the actuator pins moving the blade blocks through camming relationship, and the differential screw provides radial equalization of the blade blocks with respect to each other.

U.S. Pat. No. 6,406,225 discloses a dual cutter insert boring tool wherein the cutter inserts are connected to an elongated adjusting screw and carried on either a left-hand threaded portion thereof or a right-hand threaded portion thereof, whereby the rotation of the adjusting screw provides equal and opposite linear movements to the connected carrier blocks corresponding to the adjustment of the screw, and side plates are provided to engage the carrier blocks and associated fastener means for fastening the side plate to the tool body and for claming the carrier block to the tool body.

SUMMARY OF THE INVENTION

The present invention provides improved rigidity and controlled mounting of dual mounted carrier insert members on which are mounted cutter blades adjusted by linear movements of the insert members, which insert members are provided to be carried or inserted into at least a transverse channel opening extending through the diameter of the cylindrical boring tool, and perpendicularly to the longitudinal rotational axis of the boring tool, to be adjusted within the channel opening by rack-and-pinion movement mechanisms, and to be secured by fastener means from further linear movement after a predetermined linear movement has been secured by rack-and-pinion mechanism adjustments of the cutter insert members. The cutter insert members are mounted in a solid surround housing portion of the boring tool to protect and to secure the mounting of the insert members in an improved manner over the prior art boring tool mechanisms.

The cutter insert members of the present invention are each generally elongated with annular base portions to be inserted into the transverse channel opening, and having free end portions thereof which extend externally of the cylindrical housing of the boring tool and are provisioned to mount thereon, cutter blades in a conventional manner to provide the diametrical cutting or boring operations with respect to the workpiece. A rotatable elongated cylindrical shaped cam member or device is provided to extend within the housing of the boring tool along the longitudinal axis of the boring tool generally centrally disposed within the housing and extending perpendicularly to the extended directions of the cutter insert members, passing between the insert members, and engaging each thereof. The cam member is provided along a central portion of its elongated length section with toothed rack ridge portions, and each of the cutter insert members are provided along a central portion of the base portion of the insert members with threaded pinion ridge portions, and the inserted cam member passing between the spaced apart insert members engages the rack ridges of the cam member with the pinion ridges of the insert members, whereby the rotary cam member meshingly engages the pair of insert members, and predetermined rotation of the cam member through the rack-and-pinion action provided, causes a corresponding and opposite reciprocating linear movement of the insert members either in a direction outwardly or inwardly with respect to the cylindrical housing of the boring tool. First fastener means are provided to secure against axial displacement movement of the cam member during cutting operations, and second fastener means are provided to secure against linear displacement movements of the insert members during cutting operations.

An improvement of the present invention is to provide a pair of transverse channel openings extending through the cylindrical housing of the boring tool, and being separated or spaced apart on opposite sides of an intermediate wall portion disposed between the spaced apart channel openings. The channel openings are provided to be generally annular except are planar in shape as defined by the planar wall portion of the intermediate wall portion. In accordance with the invention, there is provided a narrowed slit or channel opening separating, bifurcating or dividing the intermediate wall portion by the predetermined height of the slip opening, and such slit opening extending into the spaced apart channel openings entirely across the intermediate wall portion, whereby the intermediate wall portion of the cylindrical housing of the boring tool is made subject to adjustment, that is, the upper portion of the intermediate wall may be caused to move toward the lower portion of the intermediate wall across the height of the narrowed slit opening to cause reduction of the annular dimensions of the channel openings to cause drag, resistance or securement of the inserted base portions of the cutter insert members in accordance with an advantage of the present invention as is disclosed by the detailed description of the preferred embodiment.

The present invention discloses an improved dual blade boring tool assembly used in diametrical boring applications of a workpiece, including in combination, a solid surround carrier housing portion of the boring tool being rotatable about an extended longitudinal axis, and having a top wall portion and at least a pair of oppositely disposed side wall portions thereof, a transverse channel opening extending through the carrier housing opening between the oppositely disposed side wall portions, and extending perpendicularly to the direction of rotation of the boring tool, a pair of linear moving cutter insert members, each thereof having an extended annular portion and a free end portion, the free end portion thereof having attachable cutter blade means to provide boring operations, and the extended annular portion thereof being insertedly mounted in the transverse channel opening of the cylindrical housing of the boring tool, and provided along an intermediate portion of its extended annular portion with threaded pinion ridge portions disposed in spaced-apart parallel relationship facing each other, a rotary elongated cylindrical cam member extended within the cylindrical housing, and having a generally central portion thereof provided with threaded rack ridge portions extending between the spaced-apart facing threaded pinion ridge portions of the insert members and engaging therewith, whereby predetermined rotary movement of the cam member causes reciprocating corresponding linear movements of the insert members by rack-and-pinion engagements thereof, and fastener means are provided to secure the cam member against axial movements during cutter operations.

It is an object of the present invention to provide for use in a boring tool, a single rotatable elongated cylindrical cam member including a toothed rack ridge portion long its elongated central dimension, comprising means of meshing engagement of the cam member with toothed pinion portions provided on and centrally disposed on the cutter insert members, to comprise rack-and-pinion means for converting rotary movement of the cam member to reciprocating linear movements of the cutter insert members, which movement is in response to the rotary movement of the cam member, and acts to move the two engaged cutter insert members in opposite linear directions to each other.

It is an object to provide that the central portion of the cam member extends within the carrier housing of the boring tool, between a pair of spaced-apart parallel disposed cutter insert members carried or mounted in the transverse channel opening, and each of the insert members is provided along its generally central portion which faces or is most proximate to or adjacent with the central portion of the other insert member, a toothed pinion ridge portion comprising means of meshing engagement of the pinion ridge portion with the rack ridge portion of the perpendicularly disposed cam member when inserted between the spaced-apart cutter insert members, each of the insert members being engaged simultaneously with the rotary cam member, whereby the rotary movement of the cam member converts the rotary movement to reciprocating in-line linear movement of each of the cutter insert members, moving the insert members the same linear distance in opposite directions within the transverse channel opening, to either adjust the cutter blades as mounted on the insert members for desired cutter operations.

It is still another object of the invention to provide a boring tool assembly with improved solid surround carrier housing within which to enclose and protect the dual cutter insert members in an improvement over prior art boring tools which mount the cutter insert member(s) on a face or planar surface of the boring tool, in guide grooves, but which do not provide the desired mounting rigidity and protection against vibration and chatter or centrifugal forces of boring operations in a workpiece.

It is an further object to provide for the carrier housing to include at least a transverse channel opening extending through the diameter of the cylindrical carrier housing in a transverse direction to the longitudinal axis of rotation of the boring tool, to mount generally elongated dual cutter insert members in the channel opening in side by side parallel and spaced relationship to each other, to provide on a centrally disposed planar surface of each of the insert members as are mounted to face each other in the channel opening, a toothed pinion ridge portion, to provide an elongated cylindrical cam member to extend within the carrier housing through the transverse channel opening and between the parallel spaced-apart cutter insert members, including on a centrally disposed section of its cylindrical elongated dimension a toothed rack ridge portion, extending the rack ridge portion of the cam member into meshing engagement with the pinion ridge portions of each of the insert members, respectively, whereby rotary movement of the cam member is effective to convert to reciprocating linear movement of each of the engaged insert members within the channel opening of the carrier housing, driving the insert members in opposite linear directions to each other by the same distance of movement, to provide adjustment of the extension or withdrawal of the insert members which carry the cutter blades in their exterior free end portions thereof.

It is an object of the invention to provide a reduced diameter portion along a preselected portion of the length dimension of the elongated cam member, in non-interference with the engagement of the cam member with the pair of cutter insert members, which reduced diameter portion defines a circumferentially extending gap or opening through the outer diameter of the cam member, defining a gap opening across the reduced diameter portion of the cam member, and to provide fastener means in the form of a pair of elongated threaded screw mechanisms or set pin members that extend in parallel spaced-apart relationship within the carrier housing, in a direction perpendicular to the extended direction of the cam member, thereby to pass through the gap opening of the cam member on opposite sides of the reduced portion of the cam member, and to become engaged with the cam member with inadvertent axial movement of the cam member to prevent such axial movement thereof when the insert members have been moved a predetermined or selected linear distance, and no further movement thereof is desired, during boring operations.

It is another and further object to provide a pair of parallel disposed spaced transverse channel openings in which to insert a pair of cutter blade insert members, respectively, and to provide a relatively narrow transverse cut or slit in the carrier housing extending or positioned between and opening into the pair of transverse channel openings, thereby to provide gap adjustment of the narrow transverse slit by application of first fastener means in the form of rotatable screw mechanisms or elongated threaded set pin members provisioned to extend perpendicularly across the height dimension of the narrow slit to engage opposing side walls of the carrier housing that define the opening of the transverse slit, for the purpose of providing adjustment of the gap dimension by tightening or loosening, respectively, of the set pin members across the gap of the transverse slit in the carrier housing, whereby the circumferential areas of the channel openings are adjusted to cause tightening or loosening, respectively, of the carrier housing with respect to the insert members and their axial movement within or along their respective transverse channel openings.

Other objects and features and advantages of the present invention will become readily apparent from the review and consideration of the disclosure as contained in and described in the following specifications and drawings, and all such other or obvious objects and uses and applications are intended to be covered in the scope and intent of the detailed description of the present invention.

The Drawings.

Similar reference characters shall denote corresponding parts, features or elements of the present invention consistently throughout the attached drawings.

DETAILED DESCRIPTION OF THE PREFERRED EMBODIMENT

Figure 1:
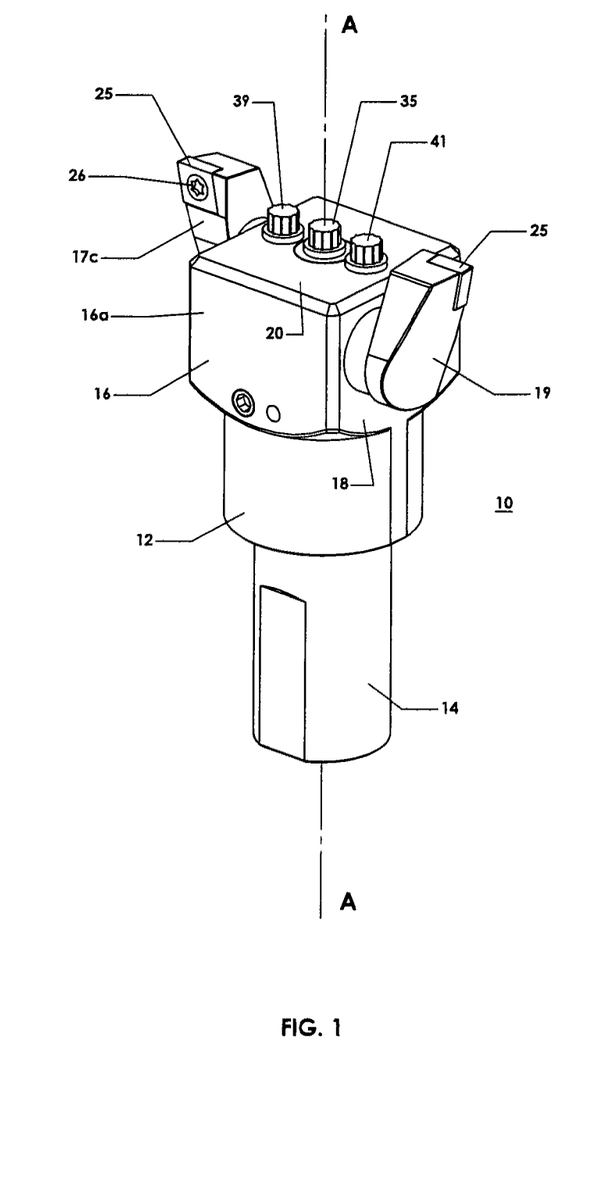
FIG. 1 is an elevated perspective view of the improved dual blade boring tool of the present invention.

There is shown in FIG. 1 of the drawings in accordance with the improved assembly of parts and features of the present invention, a preferred embodiment of a dual blade boring tool 10 configured in a conventional cylindrical elongated shape to be mounted to a conventional boring bar (not shown) in a manner to rotate about its elongated longitudinal axis, and configured to provide an annular main carrier housing 12 comprised of a lower shank portion 14 for being mounted to or gripped by a receiving boring bar in a conventional manner, and including an upper affixed box-like portion of the carrier housing 12 as shown at 16. It is commonly known in the pertinent art of boring tool applications, to provide the use of dual cutter insert members to extend from the carrier housing 16 and to carry cutter blades with which to provide boring, milling or cutting operations in a selected workpiece. Further, it is known to provide simultaneous and corresponding or equal and opposite linear adjustments to the dual insert members whereby the cutter blades are adjusted outwardly or inwardly of the diametrical bore being shaped in the workpiece. It is the improved assembly of the present invention to provide such simultaneous and equal linear adjustments for the dual insert members by rack-and-pinion connections between moving parts to achieve the novel features of the present invention, and improved adjustable carrier housing, as well as novel and simply fastener means to secure the assembly against jarring, vibrations, chatter and inadvertent movements caused by centrifugal forces of cutting operations.

Figure 2:
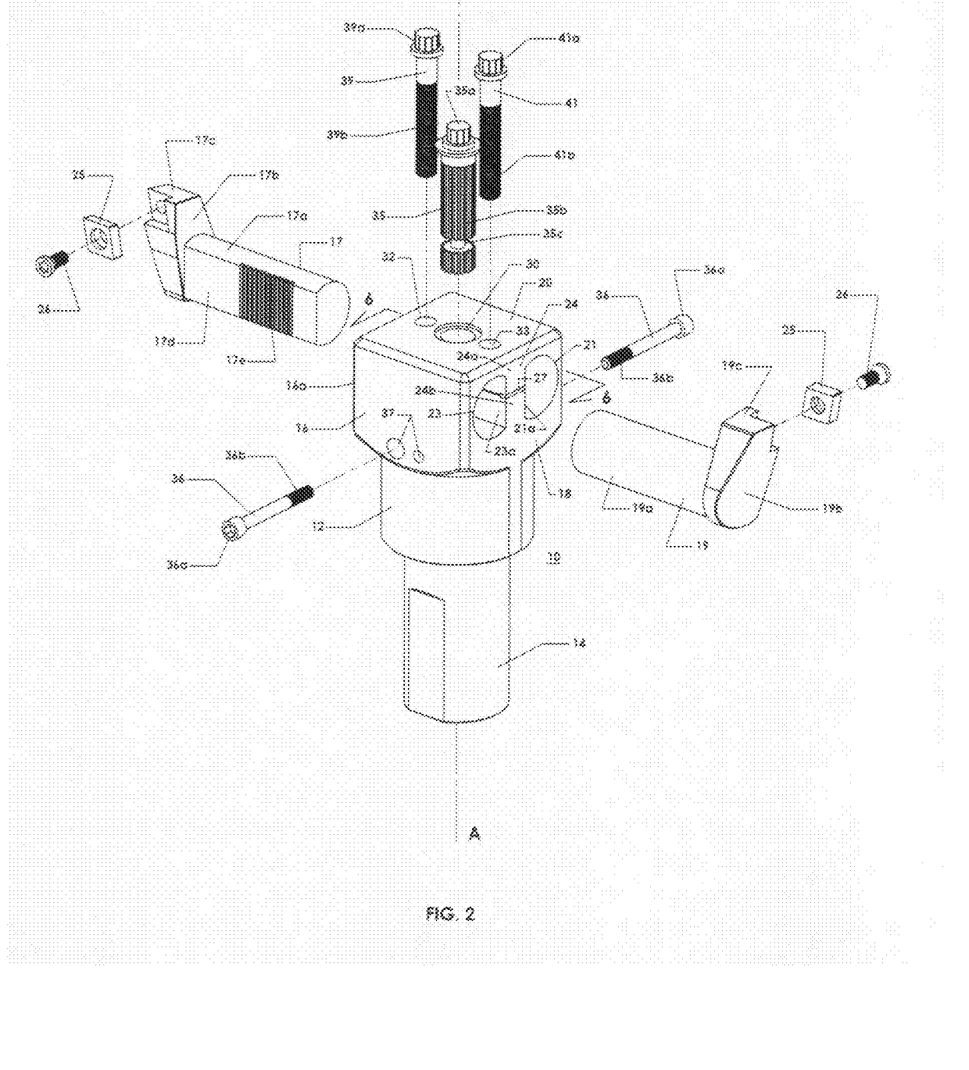
FIG. 2 is an exploded elevated perspective view of the boring tool of FIG. 1 showing removal of insertable parts in alignment to be inserted.

In FIG. 1 and FIG. 2 of the drawings, there is presented at 16 of the carrier housing 12, a box-like shaped upper portion 16 of the carrier housing 12, including a pair of oppositely disposed end walls 16a, and a pair of oppositely disposed side walls 18, and a top or upper planar surface wall portion 20. The carrier housing portion 16 comprises a solid surround carrier housing 16 in which to mount a pair of dual cutter insert members 17 and 19, respectively, within the carrier housing portion 16 below the top surface 20, in an improved housing position as compared to prior art boring tools. To this end, the carrier housing portion 16 is provided with a pair of transverse channel openings 21 and 23, best shown in FIG. 2, which are configured to extend entirely through the diameter of the cylindrical housing portion 16, extending or bored in the carrier housing portion 16 to extend transversely or perpendicularly to the direction of rotation of the boring tool 10 about its longitudinal axis shown at A-A in FIG. 1. The channel openings 21 and 23 are configured to lie parallel to each other and to be spaced apart, and one of the insert members 17 is inserted into and mounted to be carried in the channel opening 21, with an exterior free end portion being provided in a conventional manner on which to mount a cutter blade 25 by means of attachment screw 26. Similarly, the insert members 19 is inserted into and mounted to be carried in the channel opening 23, with an exterior free end portion being provided in a conventional manner on which to mount a cutter blade 25 by means of attachment screw 26. The outward and inward movements of the insert members 17 and 19 are readily known to adjust the diametrical bore being shaped by the dual cutter blades 25 in the workpiece (not shown).

There is shown in FIG. 2 of the drawings, an isolated exploded perspective view, the dual cutter insert members 17 and 19, and each thereof, is comprised of a generally elongated annular bar-like stem base portion 17a and 19a, respectively, and an opposite free-end portion 17b and 19b, respectively. The free-end portion of the dual cutter insert members 17 and 19 are provided with an upper corner portion 17c and 19c, respectively, on which to mount the cutter blades 25. The base portion 17a and 19a of the dual cutter insert members 17 and 19, respectively, are generally annular shaped along their elongated length dimension as shown at FIG. 2, but are provided with a planar surface 17d and 19d, respectively, on which there is provided a series of or multiplicity of toothed pinion ridge portions as shown at 17e and 19e, respectively, generally disposed centrally of the length dimension of the planar surface 17d and 19d, respectively. It is at once obvious that other suitable configurations, types and sizes of cutter blades 25 and attachments 26 may be utilized without material deviation from the present invention. As well, the shape or configuration of the free-end portions 17b and 19b of the dual insert members 17 and 19, respectively, may be changed or modified but so long as the base portions 17a and 19a remain configured generally as shown in the drawings and the channel openings 21 and 23 are shown to remain annular and be disposed in parallel spaced-apart relationship, so that the pinion ridge portions 17e and 19e are provided on the planar surfaces 17d and 19d, respectively, a novel feature of this invention is preserved.

In accordance with the present invention, the carrier housing portion 16 provides a solid surround carrier housing for the insertable movable dual insert members 17 and 19, being carried or mounted in the housing portion 16 below the top planar surface 20 thereof, in the channel openings 21 and 23, respectively. One of the end walls 16a is shown in FIG. 2 and one of the side walls 18a is shown in FIG. 2, and the channel openings 21 and 23 are provided to extend between oppositely disposed side walls 18a and to open from each of the side walls 18a, although FIG. 2 shows only one side of the carrier housing portion 16 in its perspective view. The dual cutter insert member 17 has its base portion 17a inserted into its associated channel opening 21 from one side wall 18a of the carrier housing portion 16 and the dual cutter insert member 19 has its base portion 19a inserted into its associated channel opening 23 from the oppositely disposed side wall 18a, so that the free-end portions 17b and 19b extend exteriorly and outwardly of the carrier housing portion 16, and carry the cutter blades 25 on their upper portions 17c and 19c, respectively. The manner of mounting the boring tool 10 on a boring bar (not shown) and the drilling use of the boring tool with respect to boring a desired diameter bore in a workpiece is not discussed as this art is well known to the practitioner of the pertinent art.

It is seen that the manner of providing a solid surround carrier housing for the dual insert members 17 and 19 is an advantage of prior art boring tools that mount their dual blade cutter members in groves provided on upper planar or exposed surfaces of the boring tool, subjecting the dual blade cutter members to less than rigid mounting, as well as to vibrations, chatter, inadvertent movements by striking against objects or movements caused by centrifugal forces of cutting operations. It is a desired feature of the present invention to provide a pair of such transverse channel openings 21 and 23 within the carrier housing portion 16, extending through the carrier housing well below the top planar surface 20 to provide the solid surround carrier housing mounting to achieve the lessening of vibrations, chatter, and movements as may be caused by centrifugal forces attributable to cutting operations. The channel openings 21 and 23 are generally annular in shape of the circumferential dimension of their defining wall surfaces as shown by the view of FIG. 2, except there is provided on one preselected interior wall surface thereof, to provide a planar vertical wall portion 21a and 23a, respectively, in accordance with corresponding to parallel alignment with the planar surface 17d and 19d of the insert members 17 and 19, respectively. With the insertion of the dual insert members 17 and 19 into the associated ones of the channel openings 21 and 23 so that the planar surfaces 17d and 19d are matched to align with the planar surfaces 21a and 23a of the channel openings 21 and 23, respectively, the insert members 17 and 19 are allowed to be inserted into the associated ones of the channel openings 21 and 23, respectively, and to move along the planar surfaces 21a and 23a of the channel openings 21 and 23. This particular design of the channel openings 21 and 23 and the insert member base portions 17a and 19a permit ease of and stability of alignment between the insert members 17 and 19a and the associated channel openings 21 and 23 of the carrier housing portion 16. The channel openings 21 and 23 are spaced apart and define therebetween an intermediate wall portion 24 shown in FIG. 2, having an upper wall portion 24a and a lower wall portion 24b, and defining between the separations of the portions 24a and 24b, a narrowed transverse extending slit-like opening or gap 27, that provides another novel feature of the present invention whereby the carrier housing 16 along the channel openings 21 and 23 is made adjustable to vary the circumferential dimension of each such channel opening 21 and 23, simultaneously, by use of fastener means in the form of a pair of screw mechanisms to be described herein.

The planar wall portions 21a and 23a define the interior side walls of the intermediate wall portion 24, and the narrowed transverse slit opening 27 opens into or communicates with both of the channel openings 21 and 23 and extends transversely to the oppositely disposed side walls 18 of the carrier housing 16, to provide separation of the carrier housing 16 along the slit 27 to define the upper intermediate wall portion 24a and the lower intermediate wall portion 24b, and the height dimension of the slit 27 is designed and intended to provide flexibility and capacity of movement of the carrier housing 16 in the vicinity or area of the intermediate wall portion 24, by utilization of fastener means in the form of screw mechanisms that will be described hereinafter in connection with the drawings. In accordance with a novel feature of the invention, and as heretofore described, the central portions of the length dimension of the planar walls 17d and 19d are provided with a series or multiplicity of vertically disposed teeth or ridges extending along the surface thereof for sufficient length dimension to be engaged for movement as hereinafter described, of the insert members 17 and 19, respectively, and defining reciprocating pinion ridge portions shown in the drawings at 17e and 19e respectively. It is not required in order to achieve the novel features of the present invention for the base portions 17a and 19a of the cutter insert members 17 and 19, respectively, to extend entirely through their associated channel openings 21 and 23 respectively, and therefore, in order to protect the movements of the insert members 17 and 19 within their associated channel openings 21 and 23, it is desirable to provide cover plates (not shown in the drawings) to cover the openings of the channel openings 21 and 23 oppositely from the protruding free-end portions 17b and 19b, respectively, which may be relatively thin wafer cover plates which are pivotably mounted by rivet pins to be pivoted into closed position when desired for protecting the channel openings from metal or material fragments created by boring operations. The desired thickness dimension of the intermediate wall portion 24 is generally illustrated in FIG. 2 but is not intended to require an exact dimension, but should be thick enough to provide the desired rigidity to the carrier housing portion 16, and to be thick enough to separate and define the parallel extending channel openings 21 and 23, and to still present flexibility of movement by the provision of the narrowed slit 27 separating the upper and lower portions 24a and 24b of the intermediate wall portion 24, as well as to allow or accommodate several apertures passing through the thickness of the intermediate wall portion 24 between the channel openings 21 and 23. Other equally suitable adaptations of cover plates or suitable dimensions of the intermediate wall portion 24 or diameters of the channel openings 21 and 23, as well as length dimension or diameter of the base portions 17a and 19a of the insert members 17 and 19 may be made without deviation from the scope and intent of the present invention.

When the insert members 17 and 19 are aligned with and inserted into their associated channel opening 21 and 23, respectively, the vertical planar wall portion 17d and 19d are received in alignment with and in close proximity to the planar wall portions 21a and 23a of the channel openings 21 and 23, respectively. The centrally disposed pinion ridge portions 17e and 19e are aligned to be generally centrally of the extended dimension of the channel openings 21 and 23, respectively. A centrally disposed and downwardly (from top planar surface 20 of the boring tool 10) extending aperture or hole 30 is provided to extend from the top planar surface 20 of the carrier housing portion 16, as shown in FIG. 2 and other figures of the drawing, along and aligned with the longitudinal axis of the boring tool 10. The hole 30 extends downwardly through the intermediate wall portion 24, both through the upper wall portion 24a and the lower wall portion 24b thereof, and is of sufficient diameter to open into or communicate with the pair of parallel spaced-apart channel openings 21 and 23 generally centrally of their length dimension, and of sufficient length dimension to permit exposure of the pinion ridge portions 17e and 19e of the insert members 17 and 19, contained in the channel openings 21 and 23, respectively. Additionally, a pair of adjacently disposed and parallel downwardly extending apertures or holes 32 and 33 are provided to open from the top planar surface 20 of the carrier housing portion 16, and to extended in parallel with the hole 30 within the carrier housing portion 16, to pass within the intermediate wall portion 24 but with a diameter dimension that is less than the thickness of the intermediate wall portions 24a and 24b, and terminates in the lower section of the carrier housing portion 16, passing across the thickness of the narrowed slit 27, and being provided with threaded section in the lower extremity of the openings 32 and 33 for purpose to be hereinafter set forth. It is apparent that the exact depth dimension of the holes 32 and 33 are not critical so long as the intended function of the holes 32 and 33 are met as described in this specification, that is, to provide the mounting of desired threaded fastener means to engage between the upper wall portions 24a and the lower wall portions 24b of the intermediate wall portion 24 to provide closure of the slit 27 to thereby provide adjustment of the circumferential dimensions of the channel openings 21 and 23.

Figures 5, 6:
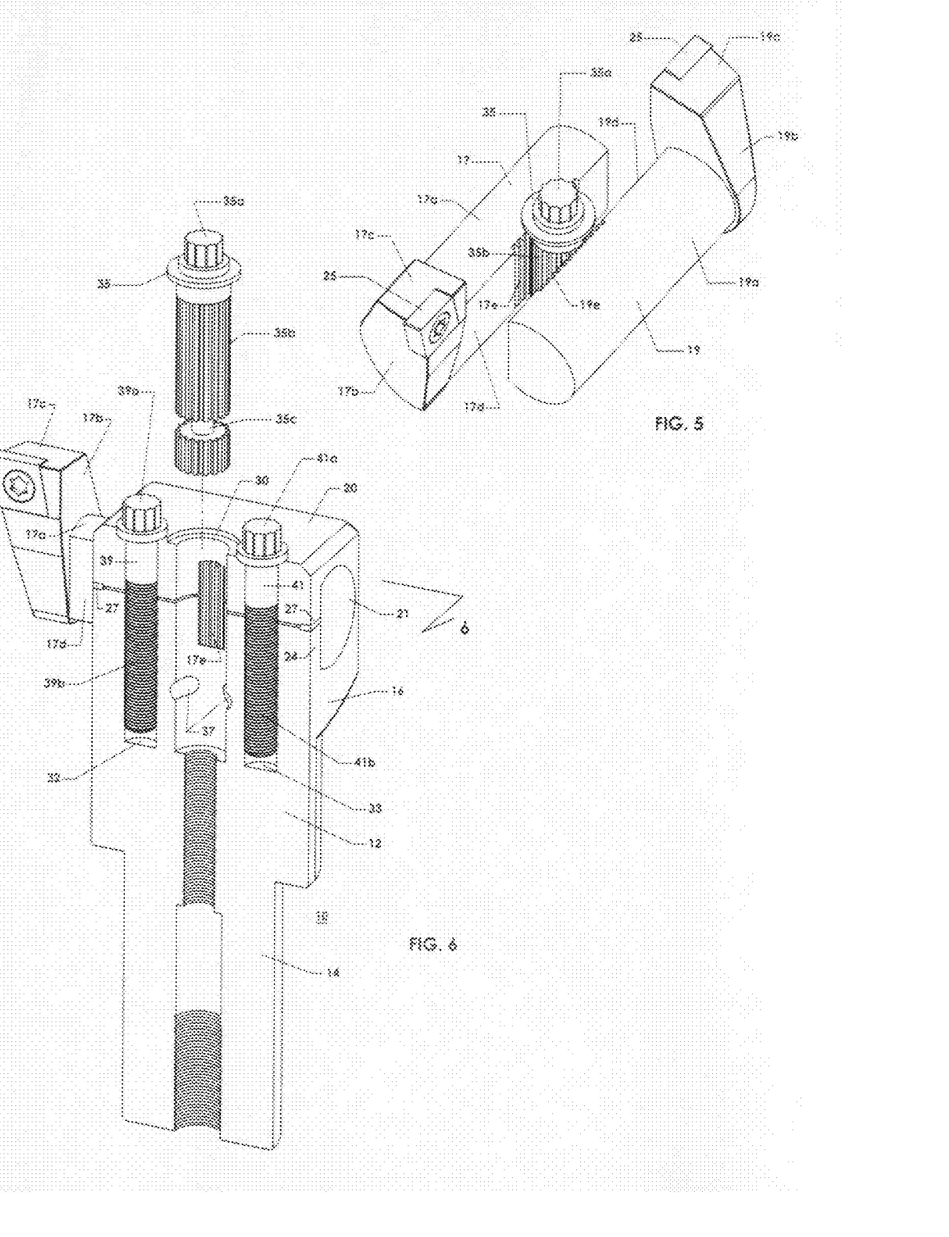
FIG. 5 is an isolated perspective view of the dual insert members engaging the cam member without the carrier housing as shown in FIG. 2 or FIG. 4.
FIG. 6 is a cut away view of the boring tool taken along the line 6-6 of FIG. 2 and FIG. 4.
Figure 7:
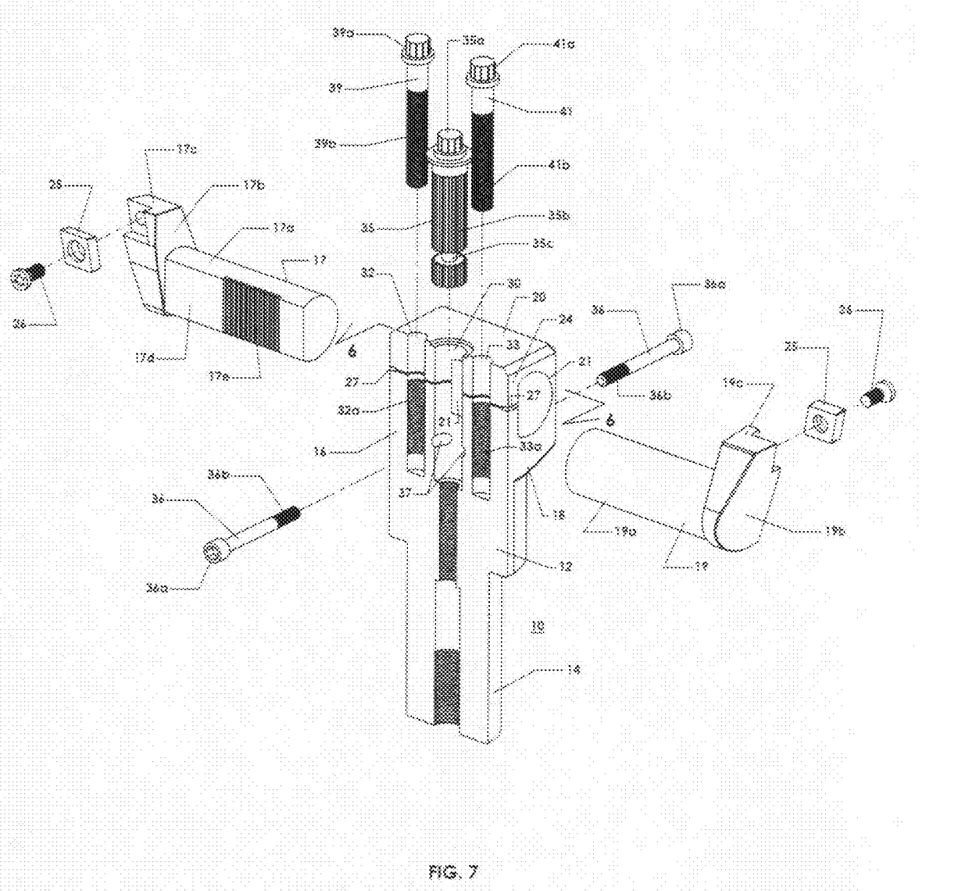
FIG. 7 is a cut away view of the boring tool similar to FIG. 6 with isolated perspective view of insertable parts thereof.

As shown in FIGS. 2, 6 and 7 of the drawings, the holes 32 and 33 are provided to extend in parallel with each other and with the hole 30, beginning at the top planar surface 20, and extending downwardly through the upper intermediate wall portion 24a, across the slit 27 and well into the lower intermediate wall portion 24b, or even lower into the carrier housing portion 16, to provide solid engagement of the intermediate wall portion 24 across the height dimension of the narrowed slit 27, whereby the flexibility of the intermediate wall portion 24 can be utilized to adjust the height dimension of the slit 27 and thereby the circumferential dimension of the annular channel openings 21 and 23 in which the insert members 17 and 19 are housed. Alternatively, the central opening or hole 30 is smooth and without threads on its annular surfaces for reasons that become apparent in the detailed description of the preferred embodiment.

At FIG. 2, there is shown, in an isolated exploded perspective view, a single rotatable elongated cylindrical cam member 35, having a hexagonal shaped top portion 35a to provide ready gripping of the cam member to achieve rotary movement thereof, and as disposed along its central length dimension and extending longitudinally and circumferentially thereof, there is provided a series of toothed rack ridge portions 35b defining a series of ridges or teeth that are engageable or to be meshed with the series of pinion ridges 17e and 19e of the aligned insert members 17 and 19 when the insert members are carried in the channel openings 21 and 23, respectively, and the cam member 35 is inserted more fully into the hole 30 passing into communication with the spaced-apart channel openings 21 and 23 along the planar surfaces 21a and 23a thereof to engage the pinion ridge portions 17e and 19e of the pair of insert members 17 and 19, respectively. The cam member 35 also includes a reduced diameter portion 35c along its lower length extremity below the rack-and-pinion engagement defined by the meshing engagement between the rack ridge portion 35b and the pinion ridge portions 17e and 19e, respectively. The reduced diameter portion 35c forms or defines a circumferentially extending gap or opening 35c as defined by the opposing upper and lower shoulders or surfaces that are created by the reduction of the outer diameter of the cam member 35, that is, the reduced diameter portion at 35c is the result of removal of the outer areas of the cam member 35, and is shown to be at the lower portion of the threaded portion 35b but need not be, as the threaded portion could easily have been terminated above the reduced diameter portion 35c, as the engagement of threaded rake portion 35b with the threaded pinion ridges of 17e and 19e are provided to be above (in the direction of the top planar surface 20) the location of the reduced diameter portion 35c.

Figure 4:
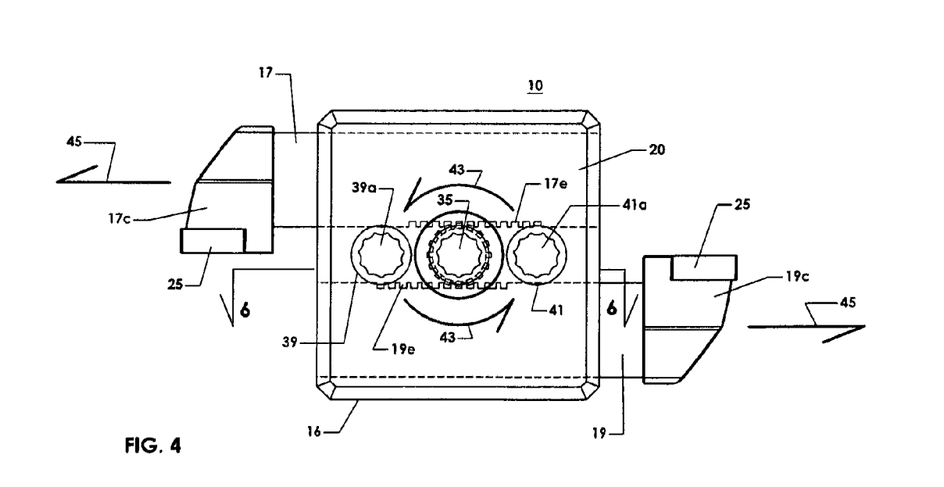
FIG. 4 is a top view of the boring tool of FIG. 1.

FIGS. 2, 6 and 7 of the drawings disclose the cam member 35 and in FIG. 2 and FIG. 7, the cam member 35 is shown in a position external of the carrier housing portion 16 above the top planar surface 20 and aligned to be inserted into the proper receiving aperture or hole 30, and then to be inserted into the carrier housing portion 16 so that the top hexagonal portion 35a is flush with the top planar surface 20 when fully inserted into the carrier housing portion 16, and the threaded rake portion 35b is inserted between the spaced-apart parallel disposed insert members 17 and 19, with the rake portion 35b in meshed engagement with the threaded pinion portions 17e and 19e (shown clearly in FIG. 4). The rotary movement of the cam member 35 by gripping the top portion 35a, results in rotary movement of the rake portion 35b in meshed engagement with the pinion portions of 17e and 19e, and moves the insert member 17 linearly within its associated channel opening 21 by the predetermined rotary movement of the cam member 35. Similarly, the same predetermined rotary movement of the cam member 35 moves the insert member 19 linearly within its associated channel 23 by the principle or rake-and-pinion connections, converting rotary movement of the rake ridge portions 35b on the cam member 35 to reciprocating linear movement of the engaged insert members 17 and 19, respectively.

It is in accordance with the feature to secure the cam member against movement along its inserted and elongated direction that a pair of elongated screw mechanisms in the form of a pair of set pins 36 are provided, best shown in FIG. 2 and FIG. 7 of the drawings in an external aligned position to be inserted into the carrier housing portion 16. A pair of apertures or holes 37 are provided to extend entirely through the thickness of the carrier housing portion 16 from end wall 16a to the opposite end wall 16a, and are of sufficient diameter to accommodate the passage or entry of the set pins 36, respectively. The holes 37 are extended parallel and in spaced-apart relationship, and open through the carrier housing 16 to intersect the hole 30 at the point of the reduced diameter portion 35c, passing in close proximity to the cam member 35 in the gap formed by the reduced diameter portion 35c, to be disposed in interfering engagement with the cam member 35 and to be effective to prevent the cam member 35 from being moved along the length dimension thereof within the hole 30, when the set pins 36 are inserted and engaged with the carrier housing 16. To this end, the set pins 36 comprise first fastener means for securing the cam member 35 from axial movement within the carrier housing portion 16 with the setting of the set pins 36 in threaded engagement within the carrier housing portion 16. The set pins 36 are each provided with a top hexagonal shaped or gripping portion 36a and a lower extremity threaded portion 36b, respectively. The holes 37 are each provided with threaded circumferential surfaces (not shown in the drawings but understood by this teaching) whereby the threaded portions 36b of the set pins are threadedly engaged by rotary movement into the aligned holes 37, being each inserted from opposite end walls 16a to cross each other in the gap formed by the reduced diameter portion 35c of the cam member 35, and each threadedly engaged on opposite sides of the cam member 35 in the carrier housing portion 16. Therefore, the reduced diameter portion 35c is aligned in its associated hole 30 with the perpendicularly extending holes 37 to allow the passage of the inserted set pins 36, and the set pins are set by threaded engagement into the receiving complementary threaded annular surface sections of the holes 37 to prevent the axial movement of the cam member 35. That is, the close or adjacent passing of the set pins 36 through the aligned gap of the reduced diameter portion 35c of the cam member 35 results in interference type setting or locking of the cam member 35 from being removed from the hole 30, or from any substantial movement axially within the hole 30, designed and intended to assure the cam member 35 to remain relatively fixed in the carrier housing portion 16 during boring operations as may be caused by vibrations, chatter or centrifugal forces of rotary boring. Rotary movement of the cam member 35 is not prevented as the rotary movement of the cam member 35 moves the insert members 17 and 19 but does not disturb the depth of insertion of the cam member 35 into the smooth surfaced hole 30, and different fastener means are employed to deter or prevent the linear axial movements of the insert members 17 and 19 within their associated channel openings 21 and 23, respectively.

To this end, it is another feature of the current invention to provide such different fastener means or second fastener means in the form of screw mechanisms in the form of a pair of elongated threaded set pins 38 and 41 as are best shown in FIG. 2, FIG. 6 and FIG. 7 of the drawings. The set pin 39 is shown in FIG. 2 and FIG. 7 to be aligned to be inserted into an associated hole 32 and in FIG. 6, to be fully inserted into the associated hole 32, and the set pin 41 is shown in FIG. 2 and FIG. 7 to be aligned to be inserted into an associated hole 33 and in FIG. 6, to be fully inserted into the associated hole 33. Each of the set pins 39 and 41 are provided with a top hexagonal shaped grip portion 39a and 41a, respectively, and lower threaded circumferential portions 39b and 41b, respectively. The lower extremities of the holes 32 and 33 are provided on annular surfaces thereof with complementary threaded sections 32a and 33a, into which the threaded portions 39b and 41b are threadedly received or engaged. In accordance with a novel feature of the current invention, the tightening of the set pins 39 and 41 within their aligned and engaging holes 32 and 33 result in moving of the upper wall portion 24a of the intermediate wall portion 24 and the lower wall portion 24b of the intermediate wall portion 24 closer together because of the flexibility of providing the gap opening 27, and whereby the gap opening 27 is made more narrow and effects the reduction of the circumferential diameter of the annular shaped channel openings 21 and 23, respectively. This feature of the current invention provides second fastener means to engage the movable insert members 17 and 19 on which the cutter blades 25 are mounted to perform boring operations. This feature is thought to provide an improved manner of mechanically braking the movements of the insert members 17 and 19, as well as better protecting the insert members by containment of the rack-and-pinion mechanisms within a solid surround housing of the boring tool 10.

It is therefore readily apparent from the detailed description of the preferred embodiment contained hereinabove, that with the rotation of the cam member 35 within its associated hole 30, as by gripping the top portion 35a thereof in any conventional manner to achieve rotary movement, the rack portion 35b is rotated in a cam like manner, and by means of the meshed engagement of the rack portion 35b with the pinion portion 17e and 19e of the insert members 17 and 19, respectively, through the provision of the diameter of the hole 30 being large enough to open into each of the channel openings 21 and 23 sufficiently therealong to allow sufficient engagement between the rack portion 35b with each of the oppositely facing and parallel spaced-apart insert members 17 and 19, to effect reciprocating linear movement of the insert members 17 and 19 within their associated channel openings 21 and 23, respectively. Each of the insert members 17 and 19 are seen to be moved linearly in corresponding linear amounts but in opposite directions with respect to each other, to result in moving both of the insert members simultaneously outwardly or inwardly of the carrier housing portion 16 to provide resulting outward or inward adjustment of the mounted carrier blades 25 for adjusting boring operations on a selected workpiece.

Figure 3:
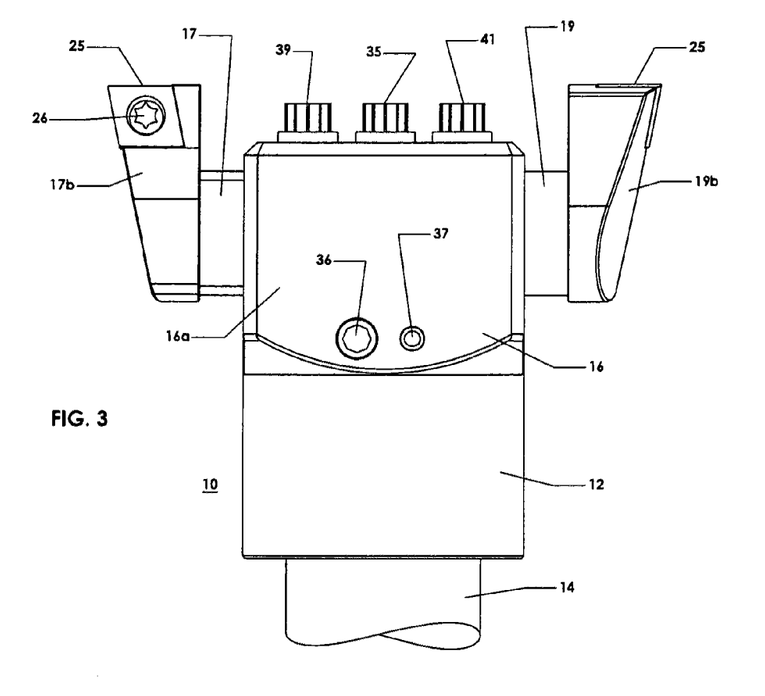
FIG. 3 is a side view of the boring tool of FIG. 1.

FIG. 3 shows a side view of the fully assembled boring tool 10 in accordance with the current invention, wherein there is shown the main carrier housing 12, the lower shank portion 14 (broken view to eliminate length thereof), and the upper carrier housing portion 16, with the insert members 17 and 19 extending outwardly and laterally of the carrier housing portion 16, presenting their free-end portions 17b and 19b attached to their elongated base portions 17a and 19a, respectively, and cutter blades 25 attached by screws 26, respectively, to upper surfaces 17c and 19c of the free-end portions 17b and 19b, respectively. It is readily seen that the current invention provides for the outward and inward adjustment of the insert members 17 and 19, and thus, the adjustment of the cutter blades 25 in a conventional manner is then achieved by the novel rack-and-pinion mechanisms of the current invention. First fastener means are provided to retrain axial movement of the fixed in-place cam member 35 within the carrier housing portion 16 in the form of the pair of set pins 36, respectively, and second fastener means are provided to adjust the channel openings 21 and 23 to restrain linear movements of the insert members 17 and 19, in the form of the pair of set pins 39 and 41, respectively.

With the rotary cam member 35 fully inserted into the associated aligned hole 30, the gap formed by the reduced diameter portion 35c along a predetermined length section of the cam member 35 is aligned with the perpendicular crossing and extending holes 37, and the set pins 36 are inserted to extend within the holes 37 (one set pin 36 into an aligned one of the holes 37) and be threadedly engaged within the holes 37, while extending through the gap of the reduced diameter portion 35c of the cam member 35 in close proximity to the cam member 35 and in interfering relationship to any material axial movement of the cam member 35 within the hole 30. The set pins 36 are each inserted from opposite end walls 16a of the carrier housing portion 16, and there is shown in the drawings one of the set pins 36 being inserted into or being contained in an associated one of the holes 37. The pair of set pins 36 so contained in threaded engagement within their associated holes 37 comprise and serve as first fastener means to restrain any significant axial movement of the cam member 35 within the hole 30. The set pins 36 are tightened as by means of the threaded sections 36b being received by complementary threaded sections (not shown) on the annular surfaces of the holes 37 within the carrier housing portion 16. In a preferred embodiment of tightening and securing the set pins 36, each of the set pins 36 is inserted from an oppositely disposed end wall 16a of the carrier housing 16.

FIG. 4 shows a top view of the boring tool 10 of FIG. 3 and discloses the meshing engagement of the rack-and-pinions features of the current invention, intended to illustrate the meshing of the cam member 35 with the insert members 17 and 19, respectively, as the insert members 17a and 19 are contained in their associated channel openings 21 and 23, respectively. The rack portion 35b is engaged with the pinion portions 17e and 19e along the base portion 17a and 19a of the insert members 17a and 19, respectively, and the rotation of the cam member 35 in the direction of the arrows at 43 counterclockwise, shows the simultaneous lateral and opposite movements of the insert members 17 and 19, respectively, in an outward direction form the carrier housing 16, as shown by the direction of the arrows at 45, respectively, to move the free end portions 17b and 19b, respectively, and thus, simultaneously and correspondingly moving the attached cutter blades 25 to adjust diametrical boring operations of a workpiece; or the reverse thereof, to rotate the cam member 35 in a clockwise direction, opposite of the directional arrow at 43, will result in moving the insert members 17 and 19 inwardly of the carrier housing 16, to adjust for reducing the diametrical cutting action by the cutter blades 25. The set pins 39 and 41 are shown in inserted and disposed on opposite sides of the centrally disposed cam member 35 in the top surface 20 of the carrier housing 16. The use of the top portions 39a and 41a of the set pins 39 and 41 provide conventional gripping surfaces to effect rotation of the set pins 39 and 41, respectively.

FIG. 5 is an exploded isolated perspective view of the dual cutter insert members 17 and 19, respectively, in illustration of the meshed rack-and-pinion toothed engagement between the rotary cam member 35 along its central length section of rack ridge portion 35b and the pinion ridge portions 17e and 19e of the insert members 17 and 19, respectively. For clarity, the cutter blade 25 is shown to be attached to the free end portions 17b and 19b of the insert members 17 and 19, respectively. FIG. 6 is a planar view taken along the lines of 6-6 of FIG. 2 and FIG. 4, providing a sectional view of the carrier housing 16, to illustrate the provisions of the current invention, namely, the rotary cam member 35 in alignment to be inserted into the aligned centrally disposed hole 30. With the cam member 35 removed, there is more clearly shown the hole 30 in cutaway or sectional view thereof, that the hole 30 is provided to extend in alignment with the longitudinal axis of the boring tool 10, and to open into and communicate with both of the side by side spaced apart channel openings 21 and 23, respectively. In FIG. 6, the particular communication of the hole 30 with the channel opening 21 allows the engaging contact or connection between the rack ridge portion 35b and the pinion ridge portions 17e of the insert member 17, and to thus illustrate the same engagement of the rack ridge portion 35b with the pinion ridge portions 19e of the insert member 19 (not shown in FIG. 6). Therefore, it is seen that the with the insertion of the cam member 35 into the aligned hole 35, the rack ridge portion 35b encircling the central portion of the cam member 35 will be meshed with and engage the pinion ridge portions 17e and 19e of the insert members 17 and 19, respectively. The dual meshing of the cam member 35 with the insert members 17 and 19 are clearly taught by the mechanisms of the current invention shown in FIG. 4 and FIG. 5 of the drawings. It is at once obvious that the rotation of the cam member 35 will be converted into corresponding reciprocating linear movements of the insert members 17 and 19 in opposite linear directions along their associate channel openings 21 and 23, respectively, by the novel and improved rack-and-pinion movements between the cam member 35 and the insert members 17 and 19, respectively.

Further, in FIG. 6, and in FIG. 7 which is taken along the cut away sectional lines 6-6 of FIG. 6, there is clearly shown the pair of tightening or adjusting screw members 39 and 41 which comprise the second fastener means of the current invention. In FIG. 6, the pair of screws or set pins 39 and 41 are inserted into the aligned and associated openings 32 and 33, respectively, extending downwardly from the top planar surface 20 of the carrier housing portion 16 from the top wall portion 20 extending downwardly into the lower extremity of the carrier housing 16. In FIG. 7, there is more advantageously disclosed, the tightening or adjusting screw member 39, when illustrated in exploded view above the carrier housing 16, to be comprised of an upper hexagonal portion 39a facilitating the grip of the screw 39 for rotation (loosening or tightening), and a threaded portion 39b throughout the majority of its length dimension, and likewise, the screw 41 is provided to have a top or upper hexagonal portion 41a and a threaded portion 41b along its free end portion, as typical to construction and configurations of screws in the art. There are provided in order to enable tightening of the screws 39 and 41, receiving and complementary threaded portions of the circumferentially side walls of the holes 32 and 33, respectively, which threaded side walls are provided and shown in the carrier housing 16 in the lower extremities of the openings 32 and 33, as disclosed at 32a and 33a, shown in FIG. 7. It is readily apparent, and in accordance with a novel feature of the invention as best shown in FIG. 6, that with or as a result of the tightening of the screw members 39 and 41 by means of engagement with or between threaded portions 39b and 32 a, and engagement between threaded portions 41b and 33a, the carrier housing 16 is caused to move or be pressed together across the transverse opening slit 27, which has been provided for this very purpose, that is, to provide tightening of the carrier housing 16, to provide means of adjusting the circumferential diameter or annular dimension of the channel openings 21 and 23, to restrict by frictional engagement between the side walls of the channel openings 21 and 23, and the slideable insert members 17 and 19, to provide the desired rigidity of mounting of the dual cutter inserts 17 and 19 within the carrier housing 16 of the boring tool 10. The loosening of the tightening screws 39 and 41 are conversely to loosen the insert members 17 and 19 within the channel openings 21 and 23, respectively.

The transverse slit opening 27 is provided to extend in the direction of the channel openings 21 and 23 in total separation of the intermediate housing wall 24 extending from between side wall portions 18 of the carrier housing 16, and the slit 27 opens into and across the perpendicular directional holes 32 and 33 and the central disposed hole 30 for the cam member 35. The transverse slit 27 is shown in the drawing to be of a slightly larger gap opening at the surfaces of the side walls 18 of the carrier housing 16, but this is a convenience of design and not function. The vertical height of the gap for slit 27 is not an exact dimension, but is instead a design function of the intended and achieved degree of tightening that is possible with the tightening of the screw members 39 and 41, to provide closure of or movement of closure for the slit 27 to result in tightening of the channel openings 21 and 23. The object of the invention to provide a means of locking or setting the insert members 17 and 19 within their associated channel openings 21 and 23 are thus achieved. The set pins 36 are designed to enter the openings 37 from opposite side walls 16a of the carrier housing and do not extend entirely through the carrier housing 16, and this is disclosed in FIG. 3 by the illustration of the set pin 36 being disposed adjacent to the openings 37 in the side wall portion 16a of the carrier housing 16.

FIG. 6 and FIG. 7 show the cutaway view of the boring tool 10, and thereby, show the aperture 30 to be extended downwardly to a predetermined depth, and thereafter the hole 30 appears to be continued along the longitudinal axis of the boring tool 10 (not numbered in the drawings) but which is useful for providing a channel for coolant fluids to be brought into and through the boring tool 10, to provide coolants such as water cooled boring tool 10. In the use of water coolant, the bottom of hole 30 would be closed and there would be provided in conventional manner, communicating or connecting channels to be branched off of the center opening as desired, and such branched channels carried to the outer circumference of the cylindrical boring tool 10 as needed. The teaching of channels for water coolant is not included herein as such provisions are common known in the relevant art.

Other equally equivalent embodiments of the present invention are readily apparent, and their inclusions or provisions are thought to be unnecessary and readily available to the practitioner of the pertinent art. All such obvious and apparent embodiments are intended to be included in the detailed description made herein. Minor modifications, choices of materials, dimensions, sizes and configurations and diameters, thread sizes and the like are intended to be included herein, and are choices to be readily made by the practitioner of the pertinent art without deviation from the scope and intent and teachings of the present invention.

What is claimed is:

1. An improved dual blade boring tool assembly used in diametrical boring applications of a selected workpiece, including in combination, a solid surround carrier housing portion of a boring tool rotatable about a longitudinal axis, and having a pair of parallel extending and spaced apart cylindrical transverse channel openings defined by the housing portion and extending entirely through the housing portion from one end wall to an oppositely disposed end wall, in perpendicular direction to the direction of rotation of the boring tool about the longitudinal axis thereof, an intermediate wall portion of the carrier housing portion including an upper wall portion and a tower divided wall portion, defining therebetween a narrowed slit-like gap opening, and including a pair of spaced apart planar side wall portions on the opposing side walls of the intermediate wall portion, the gap opening between the upper and lower portions of the intermediate wall portion opening into each of the transverse channel openings along the planar side walls of the intermediate wall portion, a pair of linear movable cutter insert members, each one having an elongated cylindrical base portion and a free end portion attached to the base portion thereof, the base portion thereof being insertedly received into an associated one of the pair of transverse channel openings, and moveable therein, the base portion of each of the pair of insert members having a planar wall portion that is aligned to pass in parallel alignment with and adjacent to the planar wall portion of the intermediate wall portion, to guide the linear movement of the associated insert member, each of the planar wall portions along the base portion of the insert members including a toothed pinion ridge portion defining a series of vertical raised ridges extended linearly along a preselected length dimension of the planar wall portion of the insert members, respectively, and being disposed in facing alignment with the pinion ridge portion of the parallel spaced apart insert members in the transverse channel openings, an elongated rotary cylindrical cam member including along a preselected length dimension thereof toothed rack ridge portion defining a series of vertical raised ridges extending circumferentially of the cam member, and the cam member being mounted to extend between and perpendicular to the parallel spaced apart planar wall portions of the base portions of the insert members, respectively, and into the transverse channel openings, and having the rack ridge portions thereof to meshingly engage with the pinion ridge portions of the insert members in the transverse channel openings, whereby rotary movement of the cam member reciprocates into corresponding linear and opposite movement of the insert members within the transverse channel openings, to adjust the cutter blades for boring operations, first fastener means perpendicularly engaging the cylindrical cam member to secure the cam member with respect to the axial movement along the extended direction of the cam member, and second fastener means to perpendicularly engage the divided upper and lower wall portions of the intermediate wall portion of the carrier housing in a direction perpendicular to the lengthwise extension of the gap opening defined by the upper and lower wall portions of the intermediate wall portion, and to be tightened to provide closure movement of the gap opening to provide closure movement of the transverse channel openings whereby the insert members are tightened in the transverse channel openings, respectively.

2. An improved dual blade boring tool assembly used in diametrical boring applications of a selected workpiece, including in combination, a solid surround carrier housing portion of a boring tool rotatable about a longitudinal axis, and having a top wall portion, and at least two oppositely disposed side wall portions, and a pair of parallel extending and spaced apart cylindrical transverse channel openings defined by the housing portion and extending entirely through the housing portion from one side wall portion to the other oppositely disposed side wall portion below the top wall portion along a direction perpendicular to the direction of rotation of the boring tool about the longitudinal axis thereof, a pair of elongated cutter insert members, each having an elongated cylindrical base portion and a free-end portion attached thereto, the free end portion having a cutter blade attachable thereto, to provide diametrical boring of a selected workpiece, and the elongated cylindrical base portion of each of the insert members being insertedly received and mounted in a selected one of the pair of cylindrical transverse channel openings and being movable in opposite directions with respect to each other, along the associated channel opening by rack-and-pinion engagement means comprised of rotary cam member including rack ridge portions thereon, and raised pinion members on the base portions of the insert members, with the rack ridge portions engaging the raised pinion members to convert rotary movement of the cam member to linear and opposite movement of each of the base portions of the insert members, and the transverse channel openings extending through the housing defining an intermediate wall portion dividing between the pair of channel openings, the intermediate wall portion having an upper portion thereof and a lower portion thereof separated by and defining therebetween a gap opening extending entirely from one side wall portion of the housing to the other oppositely disposed side wall thereof, whereby the upper wall portion of the intermediate wall portion is movable with respect to the lower wall portion thereof, and a pair of parallel spaced apart apertures extending in parallel to the direction of extension of the cam member from the top wall portion of the housing, including a to portion thereof without threads and a lower threaded portion thereof, and a pair of threaded set pin members aligned with and extending into the pair of apertures, respectively, with the threaded portions of the pin members being threadedly engaged with the threaded section of the lower portion of the pair of apertures, respectively, whereby the tightening of the pin members into the lower threaded portion of the pair of apertures, correspondingly decreases the cylindrical dimension of the pair of channel openings, respectively, to cause tightening of the channel openings, respectively, around the cylindrical dimension of the insert members to restrict axial movements of the insert members within the receiving channel openings.

3. The improved dual blade boring tool assembly of claim 2 wherein there is provided a centrally disposed aperture positioned to open from the top wall portion of the housing and being generally centrally disposed between the pair of spaced apart apertures extending from the upper portion of the intermediate wall portion into the lower portion of the intermediate wall portion, and the rotary cam member is aligned to be received into and inserted into the centrally disposed aperture and extends downwardly through the intermediate wall portion opening into each of the parallel spaced transverse channel openings, and having circumferential elongated rack ridge portions thereon exposed into each of the transverse channel openings, and the base portions of the insert members including raised pinion members which engage with the rack ridge portions of the cam member, whereby the rotation of the cam member causes a corresponding linear and opposite movements of the insert members within the transverse channel openings to adjust for extension or withdrawal of the cutter blades on the free end portion of the insert members.

* * * * *